Sept. 7, 1965 W. P. KUSHMUK ETAL 3,204,465
STATIC WHEEL BALANCER
Filed July 18, 1963 5 Sheets-Sheet 1

INVENTORS
Walter P. Kushmuk
and Ralph G. Sanders

INVENTORS
Walter P. Kushmuk
and Ralph G. Sanders
By Fidler, Beardsley, Brodby,
Patnaude & Petherbridge Attys.

Sept. 7, 1965    W. P. KUSHMUK ETAL    3,204,465
STATIC WHEEL BALANCER
Filed July 18, 1963    5 Sheets-Sheet 5

INVENTORS
Walter P. Kushmuk
and Ralph G. Sanders
BY Fidler, Beardsley, Bradley,
Patnaude & Petherbridge Att'ys

United States Patent Office 3,204,465
Patented Sept. 7, 1965

3,204,465
STATIC WHEEL BALANCER
Walter P. Kushmuk, Niles, and Ralph G. Sanders, Lake Villa, Ill., assignors to Ammco Tools, Inc., Chicago, Ill., a corporation of Illinois
Filed July 18, 1963, Ser. No. 295,897
13 Claims. (Cl. 73—483)

This invention relates to static wheel balancers and has to do more particularly with a new and improved static wheel balancer wherein the weight of the wheel and its carrying member is supported by a confined body of liquid.

In prior wheel balancers, there is commonly provided a pedestal on which is supported a wheel holding member or carrier by a pivot forming element which customarily takes the form of a cone or a ball bearing. The wheel carrier thus is free to pivot out of horizontal position in any direction. Thus when an unbalanced wheel is mounted on the wheel holding member the latter will tilt out of horizontal position. Usually an indicator such as a spirit level is provided for indicating the tilting and the extent thereof. Such devices are subject to the disadvantage that the pivot forming element is subject to wear and/or deformation in use and soon becomes inaccurate and insensitive.

In accordance with the present invention, a wheel carrier is provided wherein the wheel carrier is supported for universal tilting movement by a plunger inserted in a body of liquid contained in a chamber. The plunger is sealed in the chamber by a ring seal which permits the wheel carrier to swing about any one of an infinite number of horizontal axes depending upon the unbalance of the wheel.

An object of the present invention is to provide a new and improved wheel balancer.

Another object is to provide a wheel balancer which will retain its accuracy and sensitivity over a long period of use.

Another object is to provide a wheel balancer which is strong and rugged and which will not become inaccurate even though subjected to reasonably rough handling.

Another object is to provide a wheel balancer which can be formed with a relatively small number of machined parts and surfaces.

Another object is to provide a wheel balancer which over a long period of use is not subject to wear of such nature as to render it inaccurate.

Another object is to provide a wheel balancer which can be formed with a relatively small number of machine parts and surfaces.

Another object is to provide a wheel balancer which can be used, upon a relatively simple adjustment, to balance any one of a number of wheels of different sizes.

Another object is to provide a wheel balancer which has a pivot surface of substantial extent and of such nature that it is not readily damaged.

Another object is to provide a wheel balancer of such construction that the portion which supports the wheel is not supported solely by the pivot member.

Another object is to provide a wheel balancer wherein the contacting surfaces of the pivot are automatically polished and cleaned upon each operation of the balancer.

Another object is to provide a wheel balancer of such construction that it is not subject to damage even though a wheel in the balancer is pounded as when balancing weights are being installed on the wheel.

Another object is to provide a wheel balancer which in a preferred embodiment is readily adjustable to accommodate any one of a number of wheels of different sizes.

Another object is to provide a wheel balancer wherein the wheel carrier is supported by a plunger inserted in a confined body of liquid, the plunger being sealed in a chamber confining the liquid and which in one embodiment includes means for maintaining the sealing surfaces clean and for preventing deterioration of the sealing member.

Other objects and advantages will appear from the following description taken with the appended drawings wherein.

Figure 1:
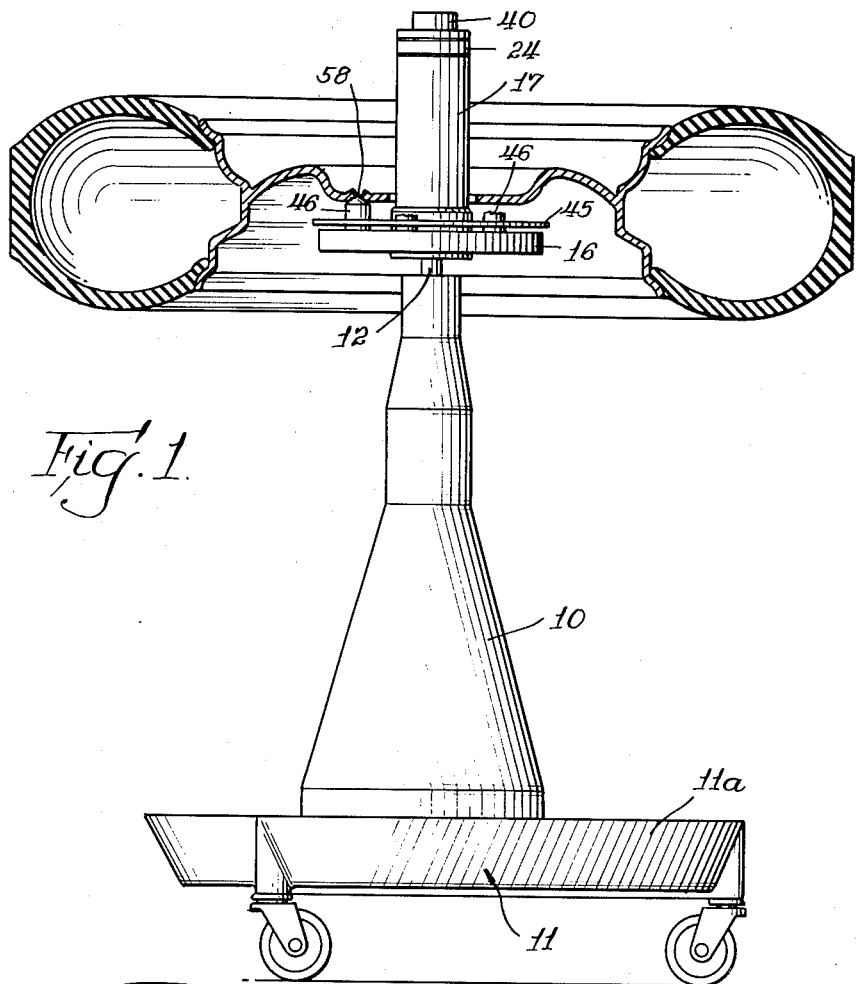
FIGURE 1 is a side elevational view of a wheel balancer according to the present invention with a wheel located thereon, certain parts being shown in section.
Figure 2:
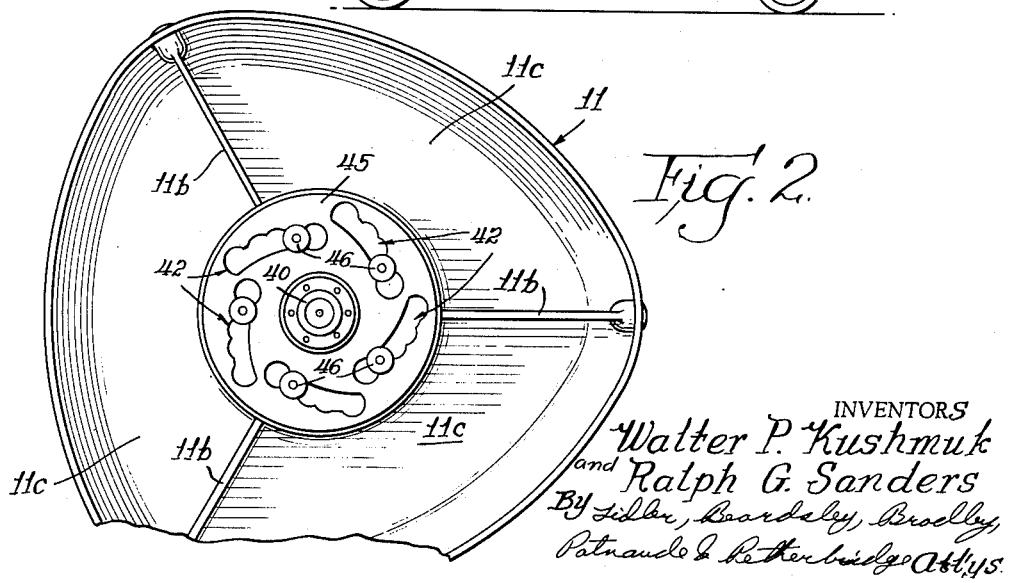
FIG. 2 is a fragmentary top plan view of the wheel balancer of FIG. 1.

A wheel is shown on the balancer only in FIGURE 1. However, it will be understood that in all forms of invention the balancer is shown in the condition it assumes when a wheel is placed on the carrier.

Figure 3:
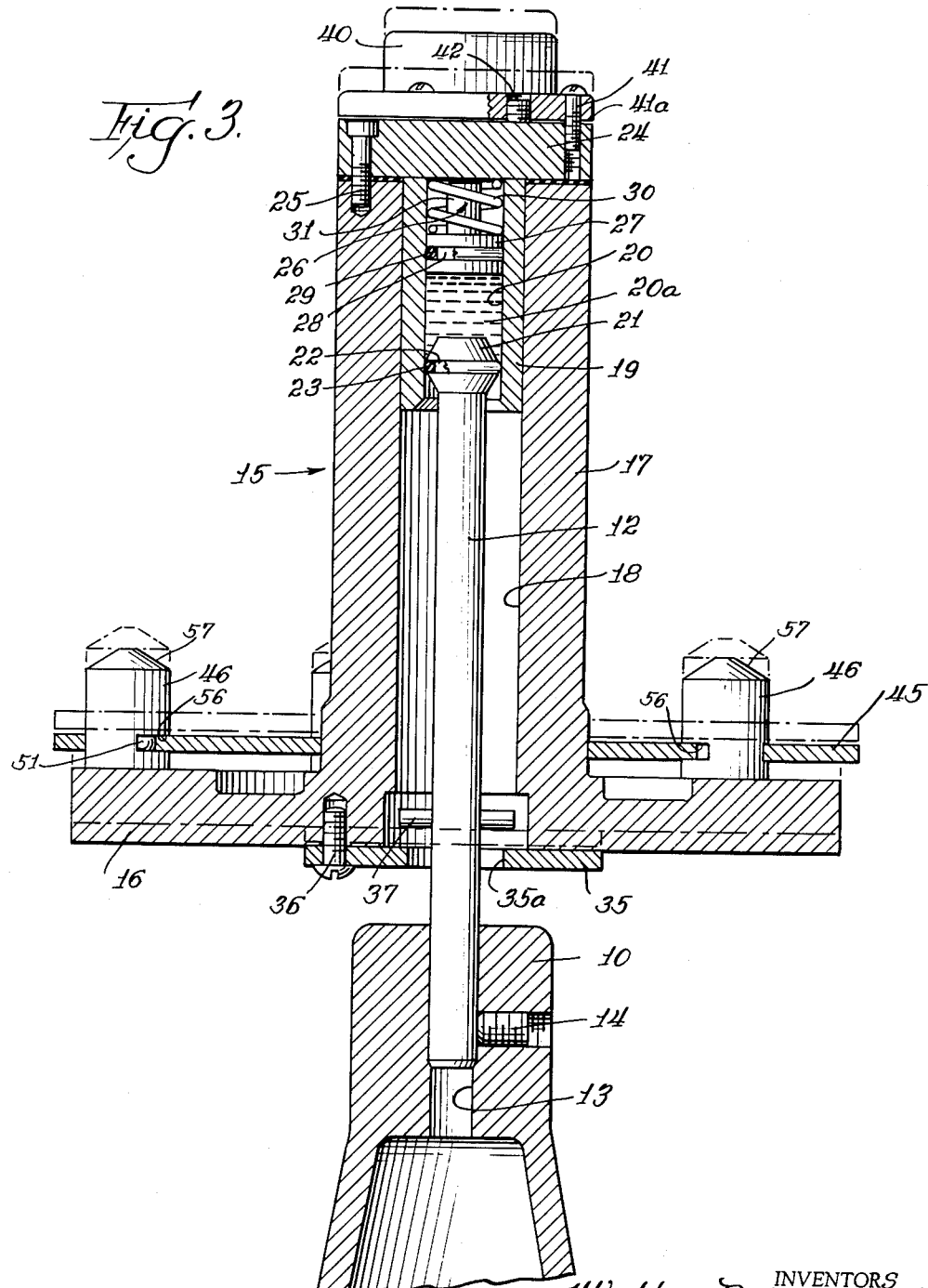
FIG. 3 is an enlarged vertical sectional view of the top portion of the wheel balancer of FIG. 1, in its position when a wheel is disposed thereon.
Figure 4:
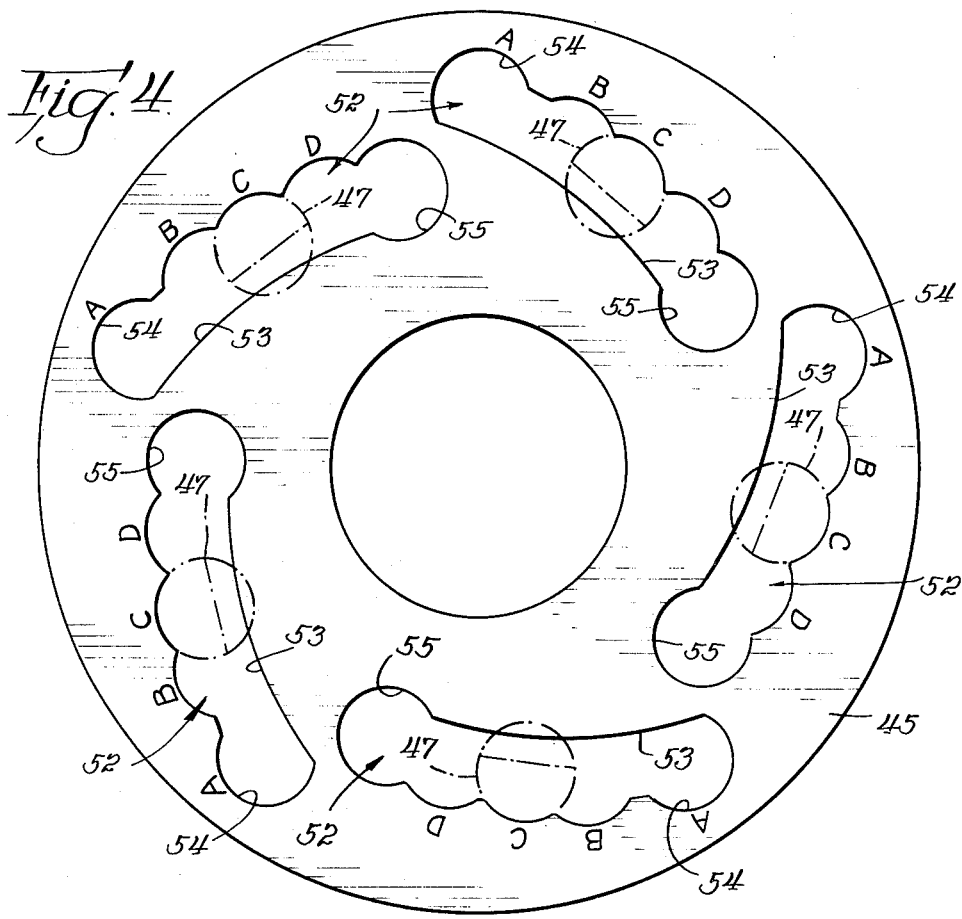
FIG. 4 is a top plan view of the stud locating plate.

Referring now to the drawings and particularly FIGURES 1 and 3, the balancer includes a supporting post 10 which may be supported on a dolly 11 or may be supported directly on the floor, it being understood that the dolly is utilized merely for convenience in moving the balancer from place to place.

The dolly 11 may be of any suitable form but preferably has upstanding side walls 11a and partitions 11b providing three separate compartments 11c where tools may conveniently be placed during the use of the balancer.

A supporting shaft or piston 12 (FIG. 3) is seated in a bore 13 in the center post 10 and is secured therein against movement by a set screw 14. A balancing head 15 or wheel carrier is supported on the shaft 12 in a manner now to be described. The balancing head 15 includes a floor portion 16 preferably of circular form and an upright, hollow, cylindrical support portion 17 having a bore 18 therein which receives the shaft 12. Disposed in the upper portion of the bore 18 is a sleeve 19 which is suitably secured to the upright portion 17 and which defines a fluid chamber 20. A body of suitable fluid 20a is located in the chamber 20. The shaft 12 has an enlarged head 21 provided with a circular groove 22 in which is located an O-ring 23. The enlarged head 21 thus serves to close the lower end of the chamber 20 and at the same time permits the balancing head 15 to be moved bodily about an infinite number of axes passing radially of the balancer head.

The upper end of the chamber 20 is closed by a cap 24 which is secured by screws 25 passing therethrough and threaded into the upper end of the upright portion 17. A piston member 26 is located in the chamber 20 and has a head 27 formed with a groove 28 in which is located an O-ring 29. The piston 26 also is provided with a stem 31 adapted to abut against the bottom wall of the cap 24.

It will be seen that the weight of the balancing head either empty or with a wheel thereon, is entirely supported by the shaft 12 and the body of liquid in the chamber 20. The spring 30 urges the piston 26 toward the head 21 of the shaft 12. This is a relatively light spring and is always under compression and therefore maintains the fluid in the chamber 20 under pressure at all times. It should be noted at this point that the relative movement between the stem and the sleeve 19 maintains the surface of the sleeve clean and the O-ring alive.

Thus, it will be seen that when there is a wheel on the carrier 15, the carrier moves downwardly until the piston 26 bottoms against the under surface of the cap 24. The carrier moves relatively to the piston 12 each time a wheel is placed on or removed from the carrier 15.

The spring 30 is of such stiffness that it maintains the fluid in the chamber 20 under a compression pressure of about 20 pounds. When there is no tire on the carrier 16, the spring urges the carrier upwardly. Upward movement is halted by engagement of a plate 35 secured as by a screw 36 to the bottom of the carrier 15 and by a pin 37 extending through the piston 12.

The plate 35 is provided with an opening 35a which is substantially larger than the diameter of the shaft 12 but of a smaller diameter than the length of the cross pin 37. Thus the carrier 15 cannot be removed from the shaft 12 except by removing the shaft 12 from the bore 13 and then removing the plate 35. When a wheel is placed on the carrier 15, the piston 26 is in abutment with the lower face of the cap 24. In this connection, it should be noted that the lightest wheel is 25 pounds which exerts a downward force greater than the force of the spring 30 thus permitting the engagement between the piston 26 and the lower face of the cap 24.

Disposed on the top of the cap 24 is a spirit level 40 which is attached to the cap by screws 41. The spirit level 40 is supported on the top face of the cap 24 and is attached thereto by a plurality of screws 41 extending through a bore 41a in the flange of the spirit level and threaded into the cap 24. A plurality and preferably three jacking screws 42 are provided which are threaded into openings in the flange of the spirit level and positioned to abut at the top surface of the cap 24. The spirit level 40 may be adjusted to a true horizontal position by suitable manipulation of the jacking screws 42. Extending through and abutting the flanges on the spirit level at the top of the cap 24 is a plurality of elevating screws 42 which permit the spirit level to be placed in a true horizontal position at a time when there is no load on the carrier 16.

It will be understood that if a wheel is placed on the carrier 16, which wheel is perfectly balanced, the spirit level will so indicate. On the other hand, if the wheel is not balanced, the spirit level will so indicate.

Means are provided for supporting a wheel on the carrier for the balancing operation. This means includes a stud locating plate or template 45 carrying a plurality of upstanding studs or locating pins 46. Each stud includes a body portion 47 having a bore 48 therethrough in which is located a spring stop 49, a coil spring 50 and a ball 51.

The stud locating plate 45 is formed with a series of slots 52 adapted respectively to receive one of the studs 47. It will be noted that each slot 52 is of arcuate shape and has one end nearer to the center of the plate 45 than the other end. One edge 53 of the slot is arcuate but not concentric with the plate. The other edge 54 is formed as a series of arcs each having a radius the same as that of the locating pin. The locating pin is inserted in the plate 45 by placing it in the end opening 55 and then moving it to a position located in one of the arcs A, B, C or D. In positioning the stud on the plate, the edge 53 of the slot 52 is caused to enter the slot 56 opening into the chamber 48 whereby the arcuate edge 53 of the plate abuts the bearing ball 51. The spring 50 exerts enough pressure on the edge of the plate 45 to hold the locating pin 47 in the plate 45.

A plurality of slots 52 and locating pins 47 are provided and one locating pin 47 is inserted in each of the slots 52.

It should be noted that by reason of the position of each slot in the plate 45, the locating pin may be inserted in the plate in any one of five positions, each of which is at a different distance from the radius of the plate than the others. This is to position the locating pins 47 at locations which are similar to the locations of the holes in the wheel. Thus, the device is capable of accommodating any one of four different diameter wheels.

Figure 5:
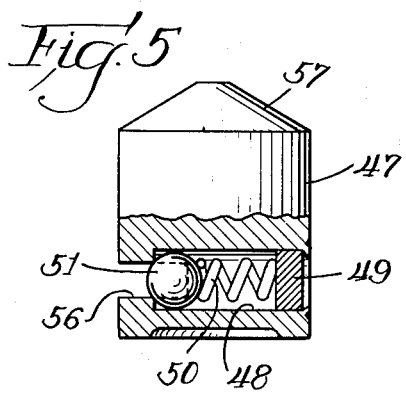
FIG. 5 is an enlarged elevational view partially in section of one of the wheel locating studs.
Figure 6:
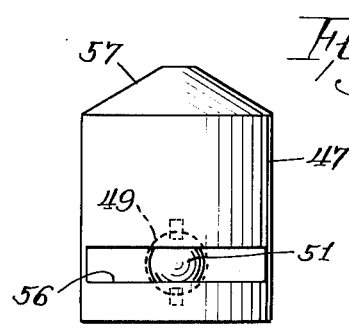
FIG. 6 is a view similar to FIG. 5, but taken from a different side.
Figure 7:
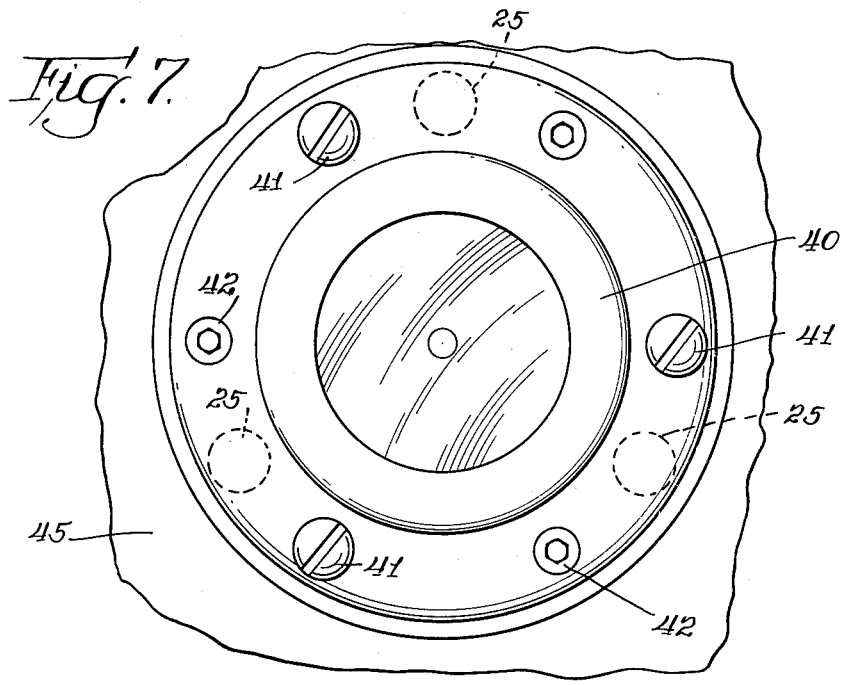
FIG. 7 is an enlarged fragmentary top plan view of the device of FIG. 1.

Referring now to FIGS. 5 and 6, it will be seen that the locating pins are each formed with a truncated conical end face 57 and the bolt openings in the wheel are placed on the surfaces 57 of the respective locating pins thus maintaining the wheel in position on the carrier.

In the operation of the device hereinabove described, the spirit level is adjusted by means of the screws 42 so that it indicates a balanced condition when there is no wheel on the carrier. This is accomplished by removing the screws 41 and thereafter screwing the screws 42 to a position in which the spirit level indicates a horizontal position. Thereafter, the screws 41 are threaded into their respective sockets in order to retain the spirit level on the cap 24.

Where there is no wheel on the balancer, the spring 30 urges the carrier upwardly and in the upper position of the carrier the stem 31 of the piston 26 is below the bottom surface of the cap 24. However, the spring acting on the piston 26 maintains the fluid in the chamber 20 under compression. The upward movement of the carrier is halted by the plate 35 engaging the pin 37.

In order to balance the wheel, the locating pins or studs are placed in the appropriate positions in their respective slots in the template. The wheel is placed on the carrier with the mounting holes 58 of the wheel receiving respectively the corresponding locating pins 46. If the wheel is truly balanced, the spirit level will show a horizontal condition of the carrier and thus the operator will know that the wheel is balanced. On the other hand, if the wheel is not in balance, it will cause the carrier 16 to tilt about the pivot formed by the O-ring 23 and the adjacent wall of the sleeve 19. This condition of unbalance will be indicated by the spirit level.

It will be seen from the foregoing that the entire weight of the carrier and the wheel is supported by the fluid in the chamber 20. Thus, with this construction there is no change in the accuracy of the device since there are no parts which may be subject to damage or wear as in the case of a conical support. Accordingly, the wheel may be pounded as when balancing weights are applied, without any damage to the device.

Repeatedly during operations there is relative movement between the O-ring seal 23 and the adjacent wall of the sleeve 19. Similarly, there is relative movement between the O-ring seal 29 and the adjacent wall of the sleeve 19. Thus the liveness of the O-rings will be maintained and at the same time the surface against which they bear will be polished. Accordingly, the device will maintain its accuracy and sensitivity over a long period of use.

It will be seen that the balancer is capable of balancing any one of four different diameter wheels.

Figure 9:
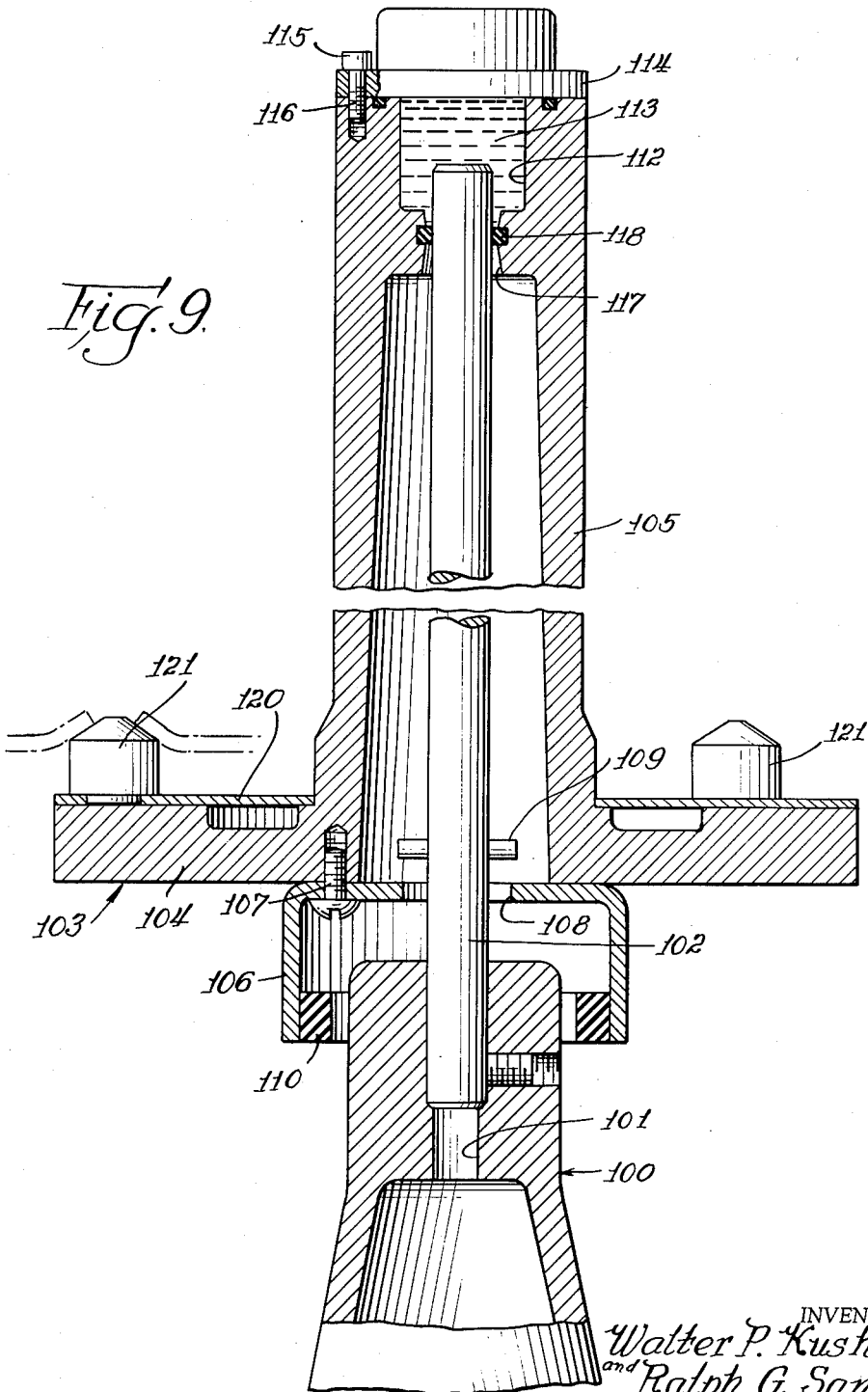
FIG. 9 is a vertical sectional view through the top portion of a modified form of wheel balancer.

A simplified form of balancer is illustrated in FIG. 9 to which reference now is made. This form of balancer includes an upstanding pedestal 100 having a bore 101 in which is inserted a center post or piston 102.

The shaft 102 is adapted to support a carrier 103 having a floor portion 104 in an upstanding portion 105.

A skirt 106 is secured to the bottom face of the floor 104 by screws 107 and has an opening 108 which receives the shaft 102 therethrough. Extending through the shaft is a pin 109 which is longer than the diameter of the opening 108 thus serving to prevent removal of the carrier from the shaft except by disassembly of the device.

The skirt 106 takes the form of a cup which opens downwardly and carries a ring 110 of rubber or other soft material and surrounds the upper portion of the post 100. Formed in the upper end of the upstanding portion 105 is a chamber 112 containing liquid 113 and the chamber is closed and sealed at its upper end by a spirit level 114 which is secured by screws 115. Jacking screws (not shown) are provided which are threaded through the flange of the spirit level 114 and positioned to abut the top face of the upstanding portion 105 as described in connection with the previously described embodiment of the invention. An O-ring seal 118 is provided between the upper end of the upstanding portion 105.

The shaft 102 extends through an opening 117 and is sealed therein by an O-ring seal 118.

A templet 120 is provided and fits over the upstanding portion 105 and rests on the top surface of the floor portion 104. The templet carries a plurality of lugs 121 spaced in a suitable arrangement to receive the mounting holes of the wheel.

It will be seen that in this form of the invention the carrier 103 is supported on the shaft 102 solely by the liquid in the chamber 112. The opening 117 leading into the chamber 112 is of such form (preferably arcuate) as to permit the carrier 103 to swing or tilt through a considerable angle about the pivot defined by the O-ring seal 118 and the adjacent portion of the shaft 102.

This form of the invention operates substantially the same as that of the previously described form.

The invention also includes the novel mounting arrangement for the balancer. By this arrangement, the balancer may be positioned outwardly from a wall of a building for use and then swung up against the wall of a building so as to be out of the way.

Figure 8:
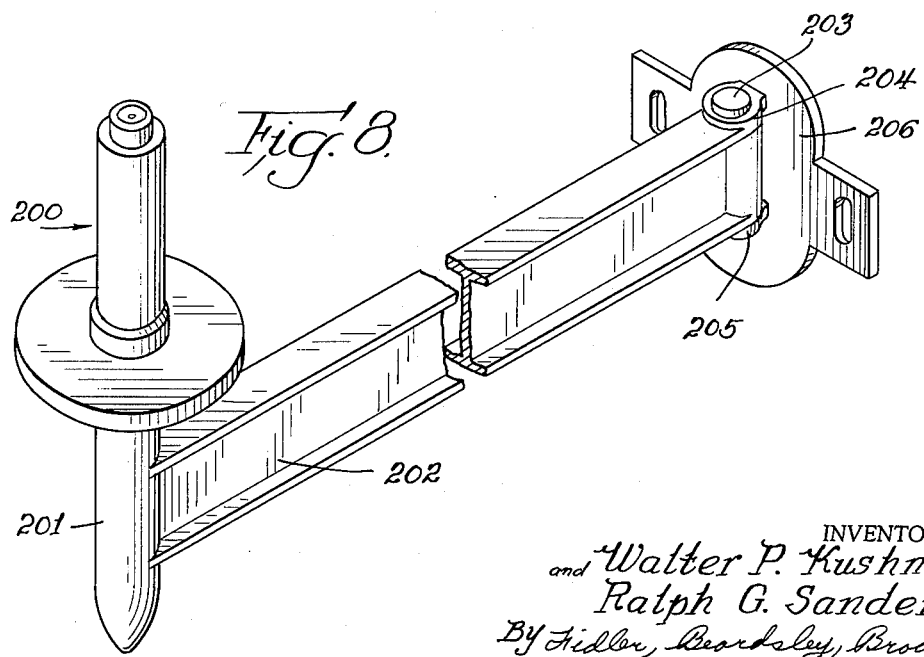
FIG. 8 is a perspective view showing a modified form of support.

Referring now particularly to FIG. 8, the device includes a balancer 200 generally similar in construction to either of the two balancers shown in FIGS. 1 to 7. The balancer has a dependent portion 201 which is carried by a support member 202 which is pivoted by a pivot pin 203 extending through bores (not shown) in two mounting elements 204 and 205 secured to or integral with the wall mounting plate 206. The balancer of FIG. 8 thus may be secured to a wall or other upstanding structure such as a large post and thus can be swung outwardly away from the wall to a position of use and can be swung to a position against the wall but not in use.

We claim:

1. A wheel balancer comprising a first means including a supporting member having an upright portion forming a piston, a second means including a wheel carrier having a chamber therein receiving said piston, said piston being shaped to provide substantially line contact with the sides of said chamber to provide for angular movement of said chamber relative to said piston, a body of liquid in said chamber and a sealing element carried by one of said means and engaging the other of said means for sealing said piston in said chamber and forming with said body of liquid means for supporting said wheel carrier for universal tilting movement on said supporting member.

2. A wheel balancer comprising a supporting member having an upright end portion, a wheel carrier having a chamber formed with a closed upper end and with an open lower end receiving said upright end portion, a body of liquid in said chamber and means sealing said end portion in said chamber thereby confining said body of liquid and forming with said body of liquid means supporting said wheel carrier for universal tilting movement.

3. A wheel balancer comprising a supporting member having an upright end portion, a wheel carrier having a vertically extending chamber formed with a closed upper end and with an open lower end receiving said upright end portion, said upright end portion being shaped to provide for angular movement of said chamber relative to said end portion, a body of liquid in said chamber, a sealing element on said upright end portion sealing the latter in said chamber thereby confining said body of liquid, a piston in said chamber between said upper end of said chamber and said body of liquid, and resilient means between the upper end of said chamber and said piston.

4. A wheel balancer as set forth in claim 3 wherein said resilient means has sufficient resistance to deflection to maintain said piston out of engagement with the upper end of said chamber except when there is a predetermined load on said wheel carrier.

5. A wheel balancer comprising a wheel carrier having a chamber at its upper end formed with a closed upper end and an open lower end of reduced diameter, a body of liquid in said chamber, a supporting rod having at least its upper end vertically disposed, said upper end being inserted in the open lower end of said chamber and a sealing element disposed between said supporting element and said wheel carrier for sealing the end of said supporting element in said chamber, said open lower end of said chamber being formed to provide for angular movement of said chamber relative to said supporting rod.

6. A wheel balancer comprising a supporting member, a wheel carrier supported on said supporting member for universal tilting movement, said wheel carrier including a body member having a table portion and an upstanding central portion, said table portion being formed with an upwardly directed face having at least portions coplanar, a plurality of wheel-locating studs removably disposed on said coplanar face portions and means including a locating member engaging said studs and said central portion for positioning said studs on said coplanar face portions.

7. A wheel balancer according to claim 6 wherein said locating member has a plurality of arcuate slots therein and said studs are disposed in said slots for movement therealong and into any one of a plurality of predetermined positions.

8. A wheel balancer according to claim 6 wherein said locating member has a plurality of slots therein extending about and in generally inclined relation to the center of said locating member, said slots each having along one edge a series of locating notches and said studs are disposed in said slots for movement therealong and into any one of a plurality of selected positions in a selected one of said notches.

9. A wheel balancer comprising a supporting member, a wheel carrier supported on said supporting member for universal tilting movement, said wheel carrier including a body member having a table portion and an upstanding central portion, said table portion being formed with an upwardly directed face having at least portions thereof coplanar, a plurality of wheel-locating studs removably disposed on said coplanar face portions, and a locating member having a central opening and a plurality of slots therein for receiving said studs respectively, each of said slots being inclined whereby one end is nearer than the other to the center of said locating member and cooperating means on said studs and said locating member for selectively positioning said studs in any one of a plurality of locations in their respective slots.

10. A wheel balancer comprising supporting means including a member having an upright portion forming a piston, a wheel carrier supported on said supporting member for universal tilting movement, said wheel carrier including means for supporting a wheel and formed means defining a chamber sealingly and tiltably receiving said piston therein, and a body of liquid in said chamber.

11. A wheel balancer comprising a supporting member having an upright portion forming a piston, a wheel carrier including means for supporting a wheel and means defining a chamber receiving said piston, said piston being contoured to provide for the angular displacement of said chamber, means including a ring seal between said piston and said wheel carrier sealing said piston in said chamber and providing a bearing and a body of liquid sealed in said chamber.

12. A wheel balancer according to claim 11 wherein said ring seal is carried by said piston.

13. A wheel balancer according to claim 11 wherein said ring seal is carried by said supporting member.

References Cited by the Examiner

UNITED STATES PATENTS

| 1,375,166 | 4/21 | Mestre | 248—240 |
|---|---|---|---|
| 1,844,620 | 2/32 | Wintroath | 308—9 |
| 2,178,101 | 10/39 | Hatch | 73—480 |
| 2,372,610 | 3/45 | Spase | 73—483 |
| 2,493,872 | 1/50 | Henry | 73—483 |
| 2,816,446 | 12/57 | Palmer | 73—483 |
| 2,844,415 | 7/58 | Ryder | 308—2 |

RICHARD C. QUEISSER, *Primary Examiner.*

JAMES J. GILL, *Examiner.*